(12) United States Patent
Yoshida (10) Patent No.: US 9,186,957 B2
(45) Date of Patent: Nov. 17, 2015

(54) ELECTRIC COMPONENT ARRANGEMENT STRUCTURE OF VEHICLE

(75) Inventor: Yuki Yoshida, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 904 days.

(21) Appl. No.: 13/432,877

(22) Filed: Mar. 28, 2012

(65) Prior Publication Data

US 2012/0248867 A1 Oct. 4, 2012

(30) Foreign Application Priority Data

Apr. 1, 2011 (JP) ................................. 2011-081576

(51) Int. Cl.
*B62D 25/20* (2006.01)
*B60H 1/00* (2006.01)
*B60H 1/24* (2006.01)

(52) U.S. Cl.
CPC .......... *B60H 1/246* (2013.01); *B60H 2001/003* (2013.01)

(58) Field of Classification Search
CPC .. B60N 2/5621; B60N 2/5628; B60N 2/5635; B60N 2/565; B60N 2/5657; B60N 2/5664; B60N 2/5642; B60N 2/56; B62D 25/20; B60H 1/00021; B60H 1/00028; B60H 1/00557; B60H 1/00564; B60H 1/26; B60H 2001/00078; B60H 2001/00092; B60H 2001/00099; B60H 2001/002; B60H 2001/00185; B60H 2001/00221; B60H 2001/002424
USPC ............... 296/193.07, 205, 208, 37.14, 37.15
See application file for complete search history.

(56) References Cited

U.S. PATENT DOCUMENTS

| | | | |
|---|---|---|---|
| 5,501,289 A * | 3/1996 | Nishikawa et al. | 180/68.5 |
| 6,152,522 A * | 11/2000 | Boulay et al. | 296/208 |
| 6,383,599 B1 * | 5/2002 | Bell et al. | 428/95 |
| 6,547,301 B1 * | 4/2003 | Keller | 296/39.3 |
| 6,715,814 B1 * | 4/2004 | Hoyle | 296/24.36 |
| 6,773,340 B2 * | 8/2004 | Nakagawa et al. | 454/144 |
| 7,048,321 B2 * | 5/2006 | Bandoh et al. | 296/37.8 |
| 7,427,093 B2 * | 9/2008 | Watanabe et al. | 296/37.15 |
| 8,641,134 B2 * | 2/2014 | Sawyer et al. | 296/208 |
| 2002/0167200 A1 * | 11/2002 | Uchida | 296/204 |
| 2010/0156146 A1 * | 6/2010 | Matsuyama | 296/193.07 |
| 2010/0320794 A1 * | 12/2010 | Maceri et al. | 296/37.15 |
| 2012/0248867 A1 * | 10/2012 | Yoshida | 307/9.1 |

(Continued)

FOREIGN PATENT DOCUMENTS

| | | | |
|---|---|---|---|
| JP | 59-39944 | * | 2/1984 |
| JP | 59-106376 | * | 6/1984 |
| JP | 2003-341373 A | | 12/2003 |

*Primary Examiner* — Gregory Blankenship
(74) *Attorney, Agent, or Firm* — Studebaker & Brackett PC (57) ABSTRACT

An electric component (electric-power convertor) and a pair of air-conditioning ducts are arranged side by side in a vehicle width direction. In case in which a rear end portion of the electric component is located in back of an outlet of the air-conditioning duct, the electric component is formed in a notch shape such that a duct-side edge portion thereof extends obliquely rearward and in a specified direction, in the vehicle width direction, away from the air-conditioning duct. Accordingly, it can be properly prevented that a conditioning air toward a passenger seated in a rear seat is blocked with the electric component arranged between a seat cushion of a front seat and a floor panel and receives any improper influence of heat emitted by the electric component, or the electric component receives any damage from the conditioning air.

16 Claims, 7 Drawing Sheets

(56) References Cited

U.S. PATENT DOCUMENTS

2012/0286541 A1* 11/2012 Kashiwagi ............... 296/193.07
2013/0127200 A1* 5/2013 Saeki ...................... 296/37.14
2013/0229030 A1* 9/2013 Yamaguchi et al. ..... 296/193.07

* cited by examiner

ELECTRIC COMPONENT ARRANGEMENT STRUCTURE OF VEHICLE

BACKGROUND OF THE INVENTION

The present invention relates to an electric component arrangement structure of a vehicle which is equipped with an electric component arranged between a seat cushion of a front seat and a floor panel and emitting heat.

It is known as shown in Japanese Patent Laid-Open Publication No. 2003-341373, for example, that a power unit is arranged between a seat cushion of a front seat (a driver's seat or a passenger's (assistant's) seat) and a floor panel forming a bottom face of a vehicle compartment.

Herein, in case in which the electric component emitting heat is arranged between the seat cushion of the front seat and the floor panel like the above-described conventional arrangement of the power unit, the arrangement location of the electric component is in the vehicle compartment, so that the reliability of the electric component can be improved and a space below the front seat can be utilized properly.

Meanwhile, in some vehicles, a conditioning air is supplied from an air-conditioning unit provided in an instrument panel toward a passenger seated in a rear seat arranged in back of the front seat via an air-conditioning duct. In general, this air-conditioning duct is arranged on the floor panel and extends in a vehicle longitudinal direction, passing below the seat cushion of the front seat.

In a case in which the above-described electric component is arranged below the front seat of the vehicle equipped with the air-conditioning duct, it is necessary to properly arrange the air-conditioning duct and the electric component in a limited space below the front seat. Thus, there exists some problem of location relationship of these members. That is, there is a concern, depending on a particular location relationship, that the conditioning air supplied from the air-conditioning duct may be blocked with the electric component or may receive an improper influence of the heat emitted by the electric component and thereby change the temperature thereof unstably. Further, when the conditioning air is a hot air, a smooth radiation of the heat emitted by the electric component may be restrained by this hot air, so that the electric component may receive some damage improperly.

SUMMARY OF THE INVENTION

The present invention has been devised in view of the above-described problems, and an object of the present invention is to properly prevent that the conditioning air toward the passenger seated in the rear seat is blocked with the electric component arranged between the seat cushion of the front seat and the floor panel and receives any improper influence of the heat emitted by the electric component, or the electric component receives any damage from the conditioning air.

According to the present invention, there is provided an electric component arrangement structure of a vehicle, comprising a floor panel forming a bottom face of a vehicle compartment of the vehicle, a front seat supported on the floor panel so as to slide in a vehicle longitudinal direction, a rear seat arranged on the floor panel behind the front seat, an electric component arranged between a seat cushion of the front seat and the floor panel, the electric component emitting heat, and an air-conditioning duct arranged on the floor panel to extend in the vehicle longitudinal direction, the air-conditioning duct having an outlet at a rear end thereof, through which a conditioning air is supplied toward a passenger seated in the rear seat at a rear end thereof, wherein the electric component and the air-conditioning duct are arranged side by side in a vehicle width direction.

According to the present invention, since the conditioning air is supplied rearward from the outlet provided at the rear end of the air-conditioning duct, it can be prevented that the conditioning air directly hits against the electric component arranged beside the air-conditioning duct in the vehicle width direction. Thus, the conditioning air is not blocked with the electric component. Further, in a case in which the heat of the electric component is radiated toward a lower side of the electric component or in a specified direction away from the air-conditioning duct, for example, the electric component may not receive any damage from the above-described conditioning air, and the conditioning air may not receive any improper influence of the heat of the electric component.

According to an embodiment of the present invention, the air-conditioning duct supplies a hot conditioning air, and a rear end portion of the electric component which is located in back of the outlet of the air-conditioning duct is formed in a notch shape such that a duct-side edge portion thereof extends obliquely rearward and in a specified direction, in the vehicle width direction, away from the air-conditioning duct. Thereby, spreading of the hot conditioning air from the air-conditioning duct and direct hitting of the hot conditioning air against the electric component can be properly prevented. Further, the suction effect of the air-conditioning duct causes sucking out of the air around the electric component, so that the electric component can be cooled properly. Moreover, the size of the electric component can be made as large as possible.

According to an embodiment of the present invention, the electric component is arranged on an outside, in the vehicle width direction, of the air-conditioning duct. Thereby, the air-conditioning duct can be arranged near and along a tunnel portion of the floor panel, so that a foot space of a passenger seated in the front seat can be ensured and an arrangement space of the electric component can be properly wide.

According to an embodiment of the present invention, the electric component is an electric-power convertor which is coupled to an electricity-storage device to store electricity via a harness and converts an electric power from the electricity-storage device for a vehicle-on-board electric equipment, and the electric component and the electricity-storage device are arranged on the same side of the vehicle relative to a center, in the vehicle width direction, of the vehicle. Herein, the electricity-storage device includes a capacitor, for example, and this capacitor can store the electricity generated by a generator (alternator) driven by an engine during a vehicle deceleration. Further, the electric component (electric-power convertor) includes a DC/DC convertor, for example, and this DC/DC convertor can convert the electric power of the capacitor from its high-voltage state to its low-voltage state and then supply the converted electric power to the vehicle-on-board electric equipment, such as an audio device.

Moreover, it is preferable that the harness coupling the electricity-storage device and the electric component be as short as possible to restrain a power-supply loss via the harness. Accordingly, the harness can be shortened properly by arranging the electric component and the electricity-storage device on the same side relative to the center, in the vehicle width direction, of the vehicle. In particular, it is preferable that the electricity-storage device be arranged outside the vehicle compartment from perspectives of its volume and the like, i.e., at a front portion or a rear portion of the vehicle, and in this case the harness can be shortened effectively.

According to an embodiment of the present invention, the electric component comprises a body portion and a harness coupling portion for coupling a harness to the body portion, and the harness coupling portion is arranged on an outside, in the vehicle width direction, of the body portion of the electric component and the air-conditioning duct. Thereby, it can be prevented that the longitudinal length of the electric component including the harness coupling portion becomes improperly long, so that the foot space of the passenger seated in the front seat or the rear seat can be prevented from being narrow. Further, while a coupling work of the harness to the harness coupling portion is generally conducted from the outside, in the vehicle width direction, of the vehicle, this coupling work can be conducted easily without being blocked with the body portion of the electric component and the air-conditioning duct.

According to an embodiment of the present invention, the electric component arrangement structure of a vehicle further comprises a cross member which is arranged on the floor panel and extends in the vehicle width direction across the air-conditioning duct, wherein the air-conditioning duct penetrates the cross member in the vehicle longitudinal direction, and the electric component is supported on an upper face of the cross member. Thereby, since the air-conditioning duct penetrates the cross member in the vehicle longitudinal direction, an appropriate arrangement of the air-conditioning duct can be provided without improperly influencing the level (height position) of the seat cushion of the front seat. Meanwhile, if the electric component is arranged, like the air-conditioning duct, to penetrate the cross member in the vehicle longitudinal direction, there is a concern that the strength of the cross member may decrease. Herein, since the electric component is supported on the upper face of the cross member according to the present embodiment, the support rigidity of the electric component can be improved, preventing the decrease of strength of the cross member. Herein, in a case in which a support portion of the electric component on the upper face of the cross member is comprised of a plate-shaped bracket or the like provided at the body portion of the electric component, the electric component can be provided without improperly influencing the level (height position) of the seat cushion of the front seat.

According to an embodiment of the present invention, the electric component arrangement structure of a vehicle further comprises a bracket to support the electric component on the floor panel, wherein the bracket comprises a cover portion to cover an upper side of the electric component and is arranged such that the cover portion thereof has an upper face which slants obliquely forward and upward. Thereby, since the cover portion of the bracket covers the upper side of the electric component, even if a tip portion of a foot of the passenger seated in the rear seat contacts (hits against) the cover portion, the electric component can be protected with the cover portion. Further, since the cover portion has the upper face slanting obliquely forward and upward, the level (height position) of a rear portion of the cover portion becomes properly low, so that the tip portion of the passenger's foot may not be easily made contact (hit against) the cover portion. Thus, the electric component can be protected more effectively and the foot space of the passenger may not be restricted improperly by the electric component. Moreover, the bracket can restrain the heat of the electric component from being directed toward the passenger's foot (upward).

According to an embodiment of the present invention, the bracket comprises a support portion to be supported on the floor panel at a rear end portion thereof, the upper face of the cover portion of the bracket includes a first slant face which is located in front of the support portion and a second slant face which is located in front of the first slant face, and a slant angle of the first slant face relative to a horizontal line is greater than that of the second slant face relative to the horizontal line. Thereby, in a case in which the tip portion of the foot of the passenger seated in the rear seat contacts the cover portion, the tip portion of the foot comes into a space between the seat cushion of the front seat and the floor panel and contacts the cover portion. Accordingly, the foot's tip portion comes to contact the rear portion of the cover portion, so that it contacts the above-described first slant face first and then is guided upward by this first slant face. Thus, the foot's tip portion may not easily contact the above-described second slant face. Further, the first slant face is located above the rear end portion of the electric component, so that the rear portion of the electric component can be covered with the portion of the cover portion where the first slant face is formed. Meanwhile, the electric component is basically covered with the portion of the cover portion where the second slant face having a gentle slope is formed, so that the size of the electric component can be made as large as possible.

According to an embodiment of the present invention, the bracket supports the electric component on the floor panel such that the electric component is located above and away from the floor panel. Thereby, there exists a gap between the electric component and the floor panel, where the heat emitted by the electric component is radiated. Accordingly, it can be effectively prevented that the heat of the electric component is directed toward the passenger's foot.

According to an embodiment of the present invention, the electric component comprises a body portion to emit the heat and a heat sink to radiate the heat emitted by the body portion, the heat sink being arranged below the body portion. Thereby, the heat of the electric component can be radiated downward surely, and in a case in which a lower portion of the vehicle is covered with water, it can be properly avoided that the body portion of the electric component is located under the water.

According to an embodiment of the present invention, when the front seat slides forward and located at a foremost position, a whole part of the electric component overlaps a seat cushion of the front seat in a plan view. Thereby, even when the front seat is slid forward and located at the foremost position, the electric component can be protected from the foot of the passenger seated in the rear seat. Further, the electric component can be located out of a visual range of the passenger, so that the appearance of the vehicle floor can be improved, which may be further improved by the above-described bracket.

According to an embodiment of the present invention, the electric component arrangement structure of a vehicle further comprises a front cross member which is arranged on the floor panel in front of the electric component and extends in the vehicle width direction, wherein a front end portion of the bracket is supported on an upper face of the front cross member, and a rear end portion of the bracket is supported on a specified portion of the floor panel in back of the electric component. Thereby, the front end portion of the bracket can be easily supported at the higher level than its rear end portion by using the front cross member so as to correspond to the slant of the upper face of the cover portion.

According to an embodiment of the present invention, the electric component arrangement structure of a vehicle further comprises a rear cross member which is arranged on the floor panel in back of the electric component and extends in the vehicle width direction, wherein an upper face of the rear cross member slants obliquely forward and upward. Thereby, since the tip portion of the foot of the passenger seated in the rear seat is directed upward when the foot is placed on the upper face of the rear cross member, it can be avoided that the tip portion of the foot contacts the cover portion of the bracket.

According to an embodiment of the present invention, at least part of the slant upper face of the cover portion of the bracket is located on an extension of the upper face of the rear cross member. Thereby, the tip portion of the foot of the passenger seated in the rear seat which is placed on the upper face of the rear cross member is directed along the upper face of the cover member, so that it can be further avoided that the tip portion of the foot contacts the cover portion of the bracket.

Other features, aspects, and advantages of the present invention will become apparent from the following description which refers to the accompanying drawings.

DETAILED DESCRIPTION OF THE INVENTION

Hereinafter, preferable embodiments of the present invention will be described specifically referring to the drawings.

Figure 1:
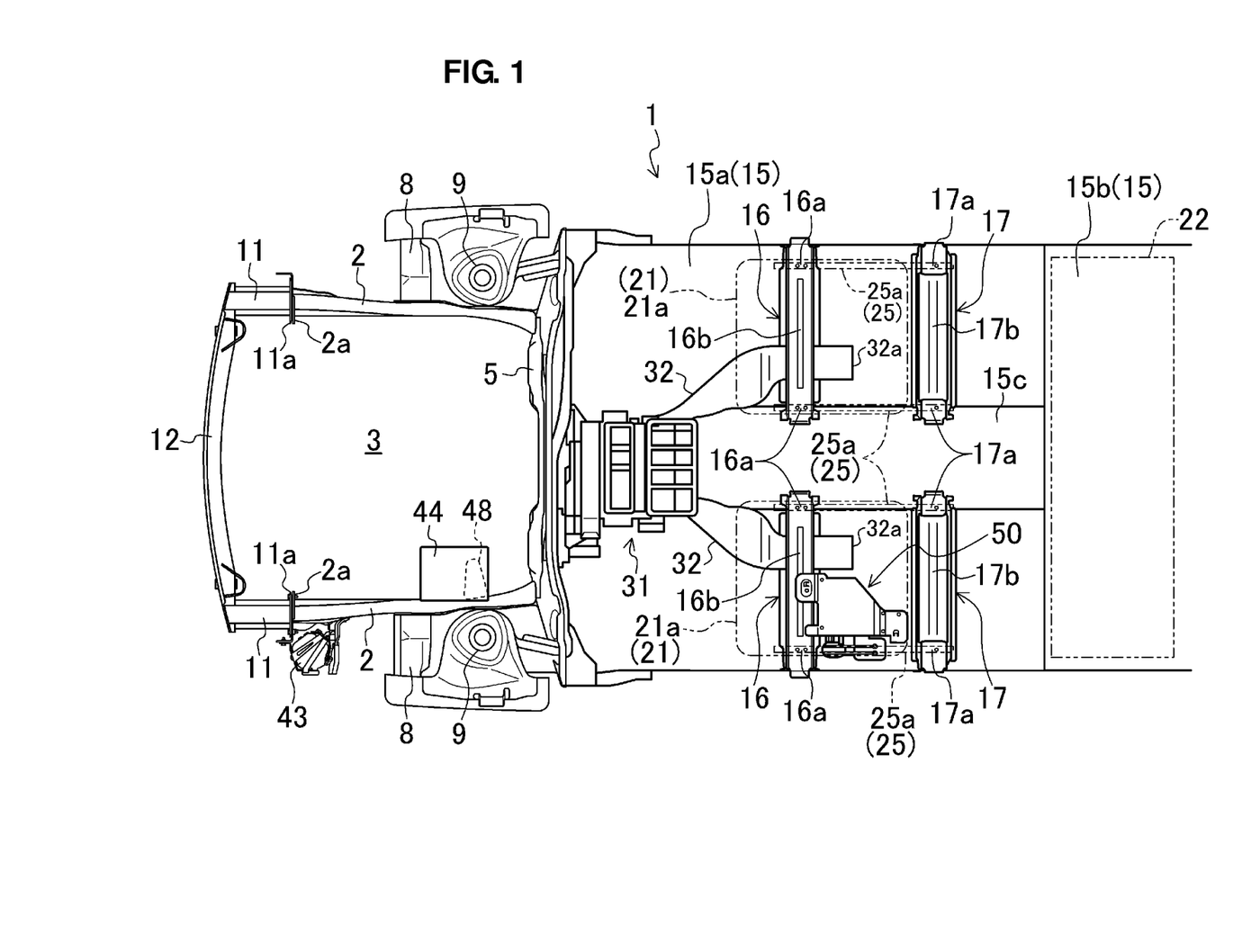
FIG. 1 is a plan view of a major part of a vehicle body of a vehicle equipped with an electric component arrangement structure according to an embodiment of the present invention.

FIG. 1 shows a vehicle body 1 of a vehicle equipped with an electric component arrangement structure according to an embodiment of the present invention. The left side of FIG. 1 corresponds to a front side of the vehicle (vehicle body 1). Hereinafter, front, rear, left, right, upper and lower sides of the vehicle (vehicle body 1) will be referred to as front, rear, left, right, upper and lower sides simply.

A pair of front side frames 2 is arranged at both-side end portions, in a vehicle width direction (a lateral direction), of a front portion of the vehicle body 1 and extends longitudinally (in a vehicle longitudinal direction). A space between the front side frames 2 forms an engine room 3 where an engine, not illustrated, is arranged. A rear portion of each of the front side frames 2 is a kick-up portion (not illustrated) which slants obliquity downward and rearward. A dash panel 5 which partitions a vehicle compartment from the engine room 3 is provided substantially at the same longitudinal position as the kick-up portion to extend in the vehicle width direction and in a vertical direction.

A pair of wheel house panels 8 to form wheel houses is fixed to respective outside faces of the pair of front side frames 2, and a suspension tower 9 is provided at an upper face of each of the wheel house panels 8.

A crash can 11 is arranged at a front end of each of the front side frames 2. A flange portion 2a is formed at a front end of the front side frame 2, a flange portion 11a is formed at a rear end of the crash can 11, and these flange portions 2a, 11a contacted each other and are fixed to each other with a fastening member (bolt and nut), not illustrated.

Front ends of the crash cans 11 are fastened to both-side end portions of a bumper beam 12 extending in the vehicle width direction, respectively. This bumper beam 12 is arranged inside a front bumper, not illustrated, which is provided at a front end portion of the vehicle, and receives a collision load in a vehicle frontal collision. When the bumper beam 12 receives the collision load from the front side in the vehicle frontal collision, the crash cans 11 crush longitudinally and thereby absorb an impact from the vehicle collision. Herein, this impact absorption may be achieved only through crushing of the crash cans in a light collision. In a heavy collision, however, the impact may be properly absorbed by the front side frames 2 crushing longitudinally in addition to the crushing of the crash cans 11.

A lower end portion of the dash panel 5 is connected to a front end portion of a floor panel 15 forming a bottom face of the vehicle compartment. The floor panel 15 comprises a front floor portion 15a and a rear floor portion 15b which is located in back of the front floor portion 15a and stands from a rear end of the front floor portion 15a to be located at a higher level than the front floor portion 15a.

Two front seats 21 (one is a driver's seat and the other is a passenger's seat (assistant seat)) are arranged side by side in the vehicle width direction on the front floor portion 15a of the floor panel 15. A rear seat 22 is arranged in back of the front seats 21 on the floor panel 15 (i.e., on the rear floor portion 15b). A rear-side portion of the front floor portion 15a located in back of the front seats 21 (i.e., a portion between the front seats 21 and the rear seat 22) is a foot-placing space for a passenger seated in the rear seat 22.

Figure 2:
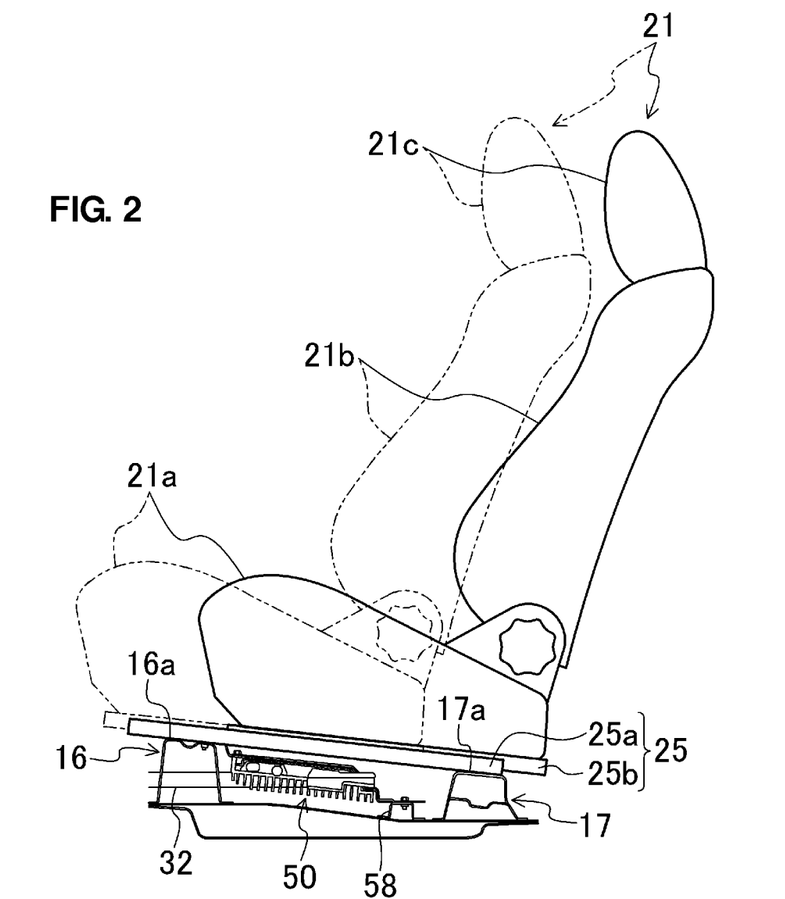
FIG. 2 is a side view showing a front seat and its support structure.

As shown in FIG. 2, each of the front seats 21 comprises a seat cushion 21a, a seatback 21b which is supported at a rear end portion of the seat cushion 21a so as to rotate longitudinally (recline), and a headrest 21c which is attached to an upper end portion of the seatback 21b.

At a central portion, in the vehicle width direction, of the front floor portion 15a of the floor panel 15 (between the right and left front seats 21) is formed a tunnel portion 15c. Further, a pair of front cross members 16 and a pair of rear cross members 17 are arranged on an upper face of the front floor portion 15c on both sides of the tunnel portion 15c. These cross members 16, 17 extend in the vehicle width direction, respectively, and are located away from each other in the vehicle longitudinal direction.

A pair of lower rail portions 25a of a seat rail 25 to slide the front seat 21 (seat cushion 21a) longitudinally is fixed to the upper faces of the front and rear cross members 16, 17. The pair of lower rail portions 25a extend longitudinally between the front cross member 16 and the rear cross member 17 at respective positions corresponding to the both-side end portions of the seat cushion 21a of the front seat 21. That is, a front end portion of each lower rail portion 25a is fixed to a rail fixing portion 16a on the upper face of the front cross member 16, and a rear end portion of each lower rail portion 25a is fixed to a rail fixing portion 17a on the upper face of the rear cross member 17. Meanwhile, a pair of upper rail portions 25b to engage with the pair of lower rail portions 25a so as to slide longitudinally is fixed to lower end portions of the both-side end portions of the seat cushion 21a of the front seat 21. The front seat 21 is supported on the floor panel 15 (front floor portion 15a) so as to slide longitudinally via the front and rear cross members 16, 17 through engagement between the lower rail portions 25a and the upper rail portions 25b. In FIG. 2, the front seat 21 located at a rearmost position in its sliding range is illustrated with a solid line, and the one located at a foremost position is illustrated with a two-dotted broken line. Further, in FIG. 3, the seat cushion 21a of the front seat 21 located at a rearmost position in its sliding range is illustrated with a two-dotted broken line.

When the front seat 21 is located at the rearmost position, a front end of the seat cushion 21a of the front seat 21 is located substantially at the same position as the front cross member in the vehicle longitudinal direction, and a rear end of the seat cushion 21a is located in back of the rear cross member 17. Meanwhile, when the front seat 21 is located at the foremost position, the front end of the seat cushion 21a is located in front of the front cross member 16, and the rear end of the seat cushion 21a is located in front of the rear cross member 17. In this state, a passenger seated in the rear seat can place a foot 71 (see FIG. 5) thereof on the upper face (on any portion of the upper face other than the rail fixing portion 17a) of the rear cross member 17.

The lower rail portions 25a of the front seat 21 are fixed to the rail fixing portions 16a, 17a of the front and rear cross members 16, 17 such that they slant obliquely forward and upward. Thereby, the front seat 21 is supported on the floor panel 15 such that the level (height position) of the seat cushion 21a of the front seat 21 rises in accordance with its forward slide. Herein, the upper faces (including the rail fixing portions 16a, 17a) of the front and rear cross members 16, 17 slant obliquely forward and upward. Slant angles of the front and rear cross members 16, 17 relative to the horizontal line is the same as a slant angle of the lower rail portion 25a relative to the horizontal line.

At a central portion, in the vehicle longitudinal direction, of the upper face of the front cross member 16 other than the rail fixing portion 16a is formed a groove portion 16b which extends in the vehicle width direction. The level of the rail fixing portion 17a is higher than that of the other portion of the upper face of the rear cross member 17. At a central portion, in the vehicle longitudinal direction, of the upper face of the rear cross member 17 other than the rail fixing portion 17a (a portion located below the rail fixing portion 17a) is formed a groove portion 17b which extends in the vehicle width direction.

An instrument panel, not illustrated, is arranged on a vehicle-compartment side of the dash panel 5, and an air-conditioning unit 31 (see FIG. 1) for air conditioning in the vehicle compartment is disposed inside the instrument panel. The air-conditioning unit 31 is configured such that the conditioning air is supplied toward a passenger seated in the front seat 21 from outlets provided at the instrument panel and also the conditioning air (hot air, in particular) is supplied toward a passenger seated in the rear seat 22 through a pair of air-conditioning ducts 32 (see FIGS. 1-3) which extends rearward from a lower portion of the air-conditioning unit 31.

The air-conditioning ducts 32 are arranged on the floor panel 15 (i.e., the front floor portion 15a) to extend longitudinally on the both sides of and along the tunnel portion 15c. Each of the air-conditioning ducts 32 has an outlet 32a at its rear end, through which the conditioning air is supplied toward the passenger seated in the rear seat 22. In the present embodiment, the two outlets 32a of the air-conditioning ducts 32 are arranged side by side in the vehicle width direction, and the range of the conditioning air supplied from the outlets 32a is illustrated with a slash mark in FIG. 3. Thus, the conditioning air from the outlets 32a spreads rearward.

The air-conditioning duct 32 extends rearward beyond the front cross member 16 below the seat cushion 21a of the front seat 21, so that the front cross member 16 and the air-conditioning duct 32 cross each other. In the present embodiment, the front cross member 16 has a through hole, through which the air-conditioning duct 32 extends. Thus, the air-conditioning duct 32 penetrates the front cross member 16 longitudinally. The outlet 32a of the air-conditioning duct 32 is located between the frond and rear cross members 16, 17 in the vehicle longitudinal direction, and in this particular embodiment, that is located slightly in front of the central position between the frond and rear cross members 16, 17.

Figure 6:
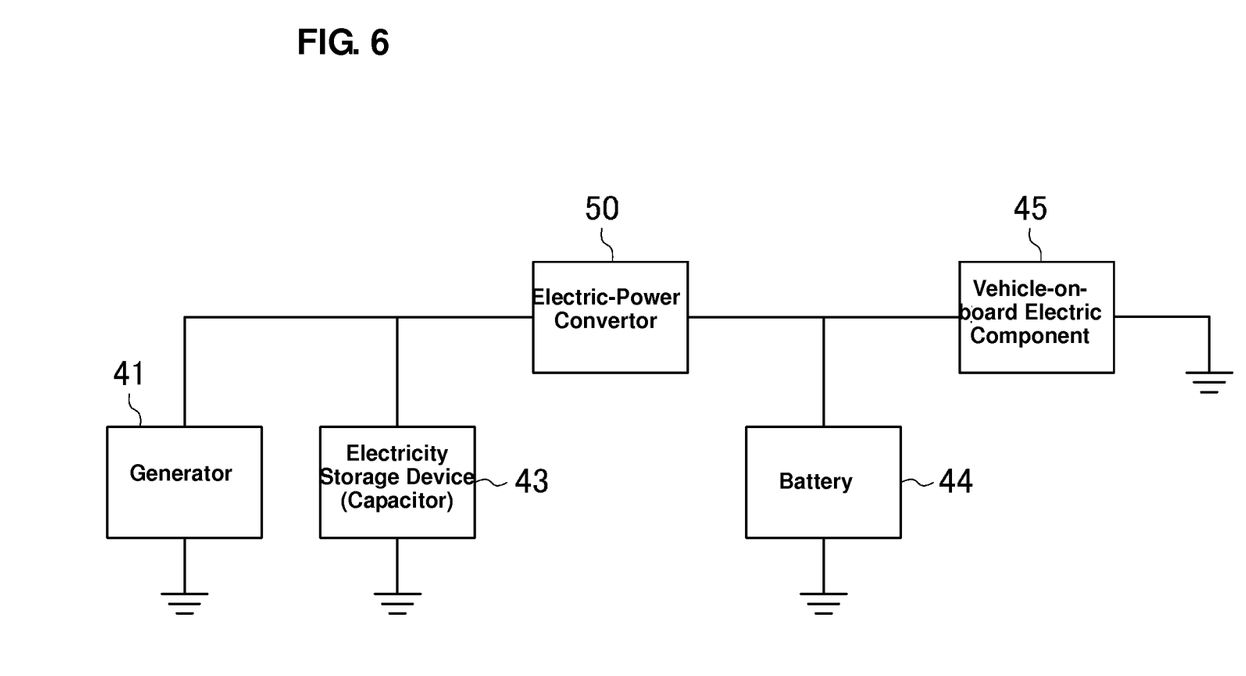
FIG. 6 is a diagram showing an electric coupling relationship of a generator, an electricity-storage device, an electric-power convertor, a battery, and an electric component.

In the present embodiment, as shown in FIG. 6, there is provided an electricity-storage device 43 to store the electricity generated by a generator 41 (alternator) which is arranged in the engine room 3 and driven by the engine during a vehicle deceleration. In the present embodiment, the electricity-storage device 43 includes a capacitor. The electricity (electric power) stored at the electricity-storage device 43 is supplied to a vehicle-on-board electric equipment 45 which is installed at the vehicle via an electric-power convertor 50. The vehicle-on-board electric equipment 45 is, for example, an audio device, a navigation device, an illumination device, or the like. Further, the extra electricity (electric power) which has not been consumed by the vehicle-on-board electric equipment 45 is supplied to and stored at a battery 44 to supply the electricity (electric power) to the vehicle-on-board electric equipment 45. During any other vehicle states other than the vehicle deceleration, the electric power generated by the generator 41 is supplied to the battery 44 via the electric-power convertor 50 for charging the battery 44.

The electric-power convertor 50 includes a DC/DC convertor which properly lowers the voltage of the electric power from the generator 41 (the electricity-storage device 43) and outputs the electric power to the battery 44 and the vehicle-on-board electric equipment 45. That is, since the voltage (e.g., 25V) on the side of the generator 41 and the electricity-storage device 43 is higher than that (e.g., 12V) on the side of the battery 44 and the vehicle-on-board electric equipment 45, it may be necessary to adjust the voltage when the electric power is supplied from the generator 41 (the electricity-storage device 43) to the battery 44 and the vehicle-on-board electric equipment 45. Accordingly, the electric-power convertor 50 including the DC/DC convertor is provided.

The electricity-storage device 43 is arranged on the outside (left side), in the vehicle width direction, of the left-side front side frame 2, i.e., on the left and outside of the engine room 3 and between a front wheel and the crash can 11 in the vehicle longitudinal direction (see FIG. 1). Further, the electricity-storage device 43 is supported at a flange portion 2a of the left-side front side frame 2 or a flange portion 11a of the left-side crash can 11 (at a flange portion connected to the flange portion 2a of the left-side front side frame 2). Thereby, the electricity-storage device 43 may not easily receive any improper influence of the heat of the engine, so that it can be cooled efficiently by air during the vehicle traveling. Moreover, the electricity-storage device 43 may not prevent the crash can 11 from performing its impact absorption function in the vehicle frontal collision (light collision), and it may not prevent the front side frame 2 from performing its impact absorption function in the heavy collision in which the front side frame 2 crushes.

The battery 44 is comprised of a lead-acid battery and arranged at a left-rear side position in the engine room 3, and supported at the left-side front side frame 2 via a battery-support bracket 48 disposed below the battery 44 (see FIG. 1).

Figure 3:
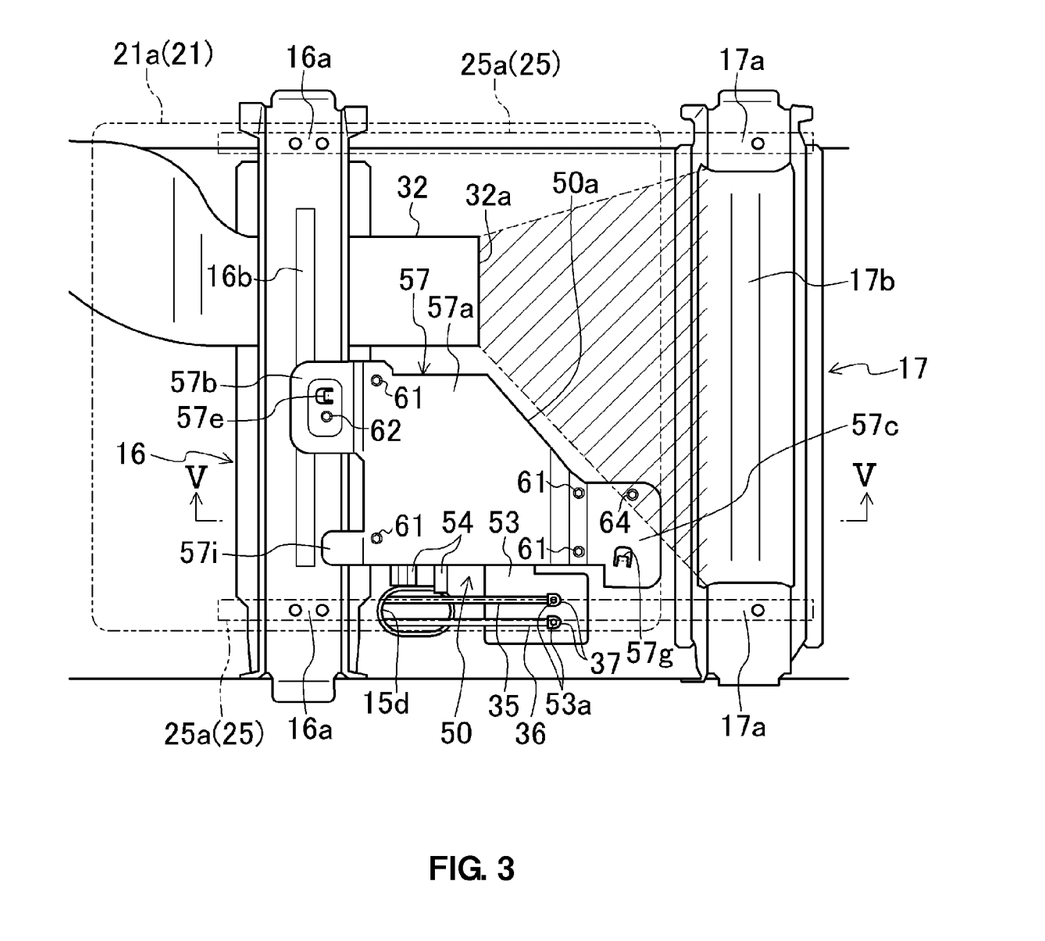
FIG. 3 is an enlarged plan view of a portion of a floor panel below a left-side front seat.

As shown in FIGS. 1 and 3, the electric-power convertor 50 is disposed between the seat cushion 21a of the left-side front seat 21 (hereinafter, referred to as the front seat 21, simply) and the floor panel 15 (front floor portion 15a). This electric-power convertor 50 and the left-side air-conditioning duct 32 (hereinafter, referred to as the air-conditioning duct 32, simply) which is likewise disposed between the seat cushion 21a of the front seat 21 and the floor panel 15 are arranged side by side in the vehicle width direction. In the present embodiment, the electric-power convertor 50 extends longitudinally on the outside, in the vehicle width direction, of the air-conditioning duct 32. The electric-power convertor 50 corresponds to an electric component emitting heat of the present invention.

Figure 4:
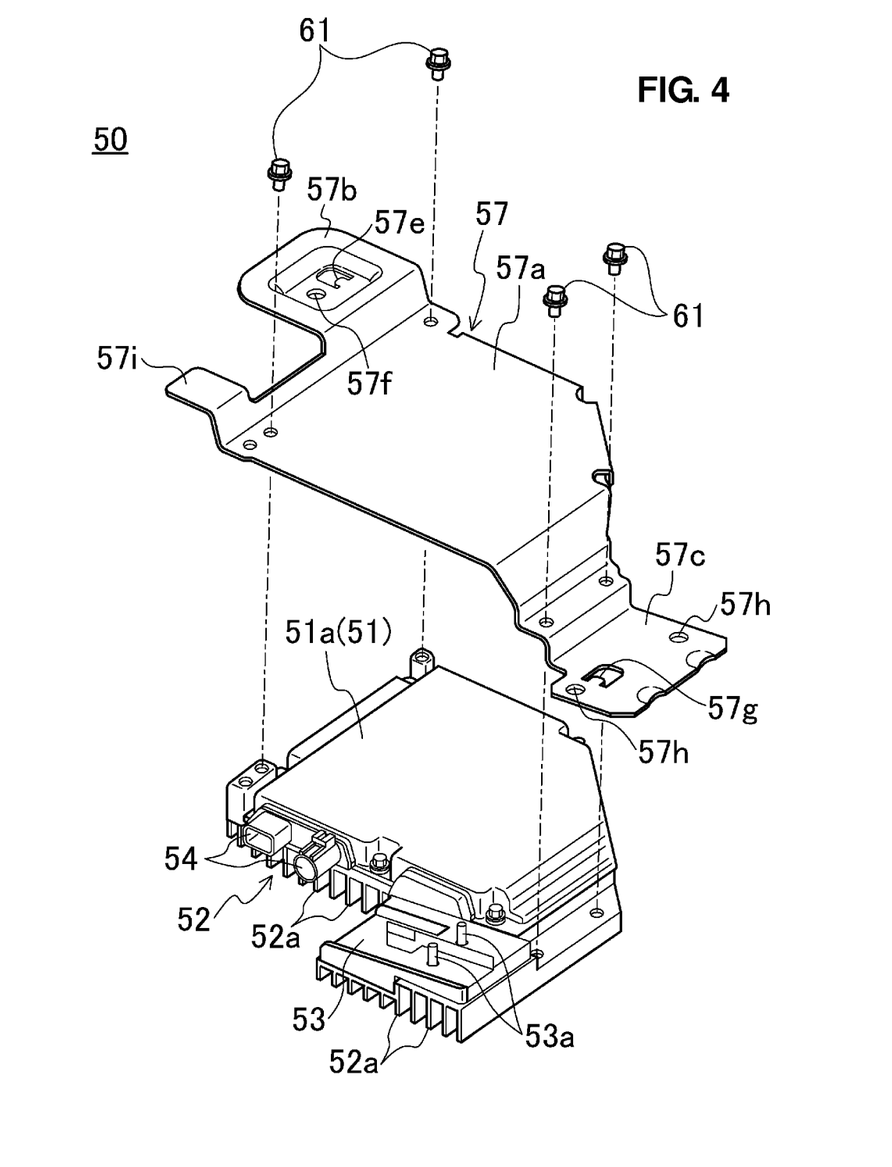
FIG. 4 is an exploded perspective view showing constitution of an electric-power convertor.

The electric-power convertor 50, as shown in FIG. 4, comprises a body portion 51, a heat sink 52, a harness coupling portion 53, and two terminal portions 54.

The body portion 51 of the electric-power convertor 50 includes a case 51a which stores the above-described DC/DC convertor therein. This case 51a has an opening at its lower face, and this opening is covered with the heat sink 52. The case 51a is fixed to an upper face of the heat sink 52.

The heat sink 52 is provided below the case 51a of the body portion 51 of the electric-power convertor 50, and has, at its lower face, plural projection portions 52a, each of which projects downward and extends in the vehicle width direction. These plural projection portions 52a are arranged side by side in the vehicle longitudinal direction. The heat sink 52 radiates the heat emitted by the body portion 51 of the electric-power convertor 50 (DC/DC convertor) downward.

The harness coupling portion 53 is provided on an outside face of the case 51a of the body portion 51 and thereby it is located on the outside, in the vehicle width direction, of the body portion 51 of the electric-power convertor 50. Further, since the body portion 51 is located on the outside of the air-conditioning duct 32, the harness coupling portion 53 is located on the outside, in the vehicle width direction, of the air-conditioning duct 32. Herein, the heat sink 52 extends up to a position below the harness coupling portion 53.

The harness coupling portion 53 is a portion where one end portion (located on the side of the electric-power convertor 50) of a first harness 35 which couples the electricity-storage device 43 and the electric-power convertor 50 (DC/DC convertor) and one end portion (located on the side of the electric-power convertor 50) of a second harness 36 which couples the battery 44 and the electric-power convertor 50 (DC/DC convertor) are coupled. These harnesses 35, 36 pass below the dash panel 5 and a front-side portion of the front floor portion 15a, come into the vehicle compartment via a through hole 15d (see FIG. 3) formed at a portion of front floor portion 15a which is located in front of the harness coupling portion 53, and then reach an upper face of the harness coupling portion 53. To each end portion of the first and second harnesses 35, 36 is attached a coupling metal 37 having a bolt hole. A pair of bolts 53a which is formed to stand on the harness coupling portion 53 is inserted into the above-described bolt holes, and then nuts (not illustrated) are fastened to the bolts 53. Thereby, the first and second harnesses 35, 36 are electrically coupled to the DC/DC converter via the coupling metals 37, bolts 53a, and nuts. In the present embodiment, the supply of electricity from the electric-power convertor 50 to the vehicle-on-board electric equipment 45 is conducted via a third harness, not illustrated, which couples the second harness 36, the battery 44 and the vehicle-on-board electric equipment 45.

The harness coupling portion 53 is located on the outside, in the vehicle width direction, of the body portion 51 of the electric-power convertor 50 and the air-conditioning duct 32, so that a coupling work of the first and second harnesses 35, 36 to the harness coupling portion 53 can be conducted from the outside easily without being interrupted by the body portion 51 of the electric-power convertor 50 or the air-conditioning duct 32.

The electricity-storage device 43 and the electric-power convertor 50 are arranged on the same side (on the left side in the present embodiment) relative to the center in the vehicle width direction, so that the first harness 35 can be shorter than another case in which they are arranged on the different sides. Likewise, since the battery 44 and the electric-power convertor 50 are arranged on the same side (left side) relative to the center in the vehicle width direction, so that the second harness 36 can be shorter than another case in which they are arranged on the different sides. Thereby, the length of the first and second harnesses 35, 36 (the first harness 35 on the high-voltage side) can be short, the supply loss of the electric power can be restrained properly.

To the above-described two terminal portions 54 are coupled respective end portions (on the side of the electric-power convertor 50) of two signal lines (not illustrated) which couple the electric-power convertor 50 (DC/DC convertor) to a controller, not illustrated, which is arranged in the engine room 3 and controls the electric-power convertor 50. These signal lines come into the vehicle compartment via the above-described through hole 15d and extend upward and are coupled to the terminal portions 54.

The electric-power convertor 50 has a bracket 57 to support (attach) the electric-power convertor 50 on the floor panel 15 (front floor portion 15a). The electric-power convertor 50 is supported at a portion of the floor panel 15 between of the front and rear cross members 16, 17 via the bracket 57.

The bracket 57 is fixed to an upper face of the heat sink 52 with four bolts 61, covering over the upper face of the case 51a of the body portion 51 of the electric-power convertor 50. That is, the bracket 57 includes a cover portion 57a to cover over an upper side of electric-power convertor 50.

A front support portion 57b is provided at a front side of the cover portion 57a of the bracket 57 (at a front end portion of the bracket 57). This front support portion 57b rises from the front end of the cover portion 57a and is supported at (fixed to) the upper face of the front cross member 16. A rear support portion 57c is provided at a rear side of the cover portion 57a of the bracket 57 (at a rear end portion of the bracket 57). This rear support portion 57c is supported at (fixed to) the floor panel 15. In the present embodiment, the rear support portion 57c is supported at the floor panel 15 via a support member 58 which is provided at a portion of the upper face of the floor panel 15 which is located in front of the rear cross member 17 and in back of the electric-power converter 50. That is, the rear support portion 57c is supported at (fixed to) an upper face of the support member 58. Herein, the rear support portion 57c may be directly supported at (fixed to) the portion of the floor panel 15, not via the support member 58.

A projection portion 57d which projects downward (see FIG. 5) is formed at a lower face of the front support portion 57b, and a dent is formed at a portion of an upper face of the front support portion 57b which corresponds to the above-described projection portion 57d. A lower face of the projection portion 57d is fixed to the upper face of the front cross member 16 with a pair of bolt 62 and nut 63 (see FIGS. 3 and 5). Herein, the projection portion 57d contacts a portion of the upper face of the front cross member 16 other than (in back of) the groove portion 16b.

The upper face of the rear support portion 57c and the upper face of the support member 58 are almost flat, and the rear support portion 57c is fixed to the upper face of the support member 58 with two pairs of bolts 64 and nuts 65 (see FIGS. 3 and 5) in a state in which the lower face of the rear support portion 57c contacts the upper face of the support member 58.

At the projection portion 57d of the front support portion 57b are provided a front positioning portion 57e which bends downward from the lower face of the projection portion 57d and a bolt through-hole 57f through which the bolt 62 extends (see FIGS. 3 and 4), which may not be so clear from the drawings. At the rear support portion 57c are provided a rear positioning portion 57g which bends downward from the lower face of the rear support portion 57c and two bolt through-holes 57h through which the bolts 64 extend (see FIGS. 3 and 4). Meanwhile, at the upper face of the front cross member 16 are formed a front positioning hole to engage with the front positioning portion 57e and a bolt through-hole through which the bolt 62 extends, and at the upper face of the support member 58 are formed a rear positioning hole to engage with the rear positioning portion 57g and two bolt through-holes through which the bolts 64 extend, which are not illustrated in the drawings. When the bracket 57 attached to the electric-power convertor 50 is fixed to the front cross member 16 and the support member 58, the front positioning portion 57e and the rear positioning portion 57g are made engage with the front positioning hole of the front cross member 16 and the rear positioning hole of the support member 58 respectively for achieving positioning of the bracket first. Thereby, respective positioning between the bolt through-hole 57f of the front support portion 57b and the bolt through-hole of the front cross member 16 and between the two bolt through-holes 57h of the rear support portion 57c and the two bolt through-holes of the support member 58 are conducted. Consequently, a fastening work of the bolts 62, 64 and the nuts 63, 65 can be easy.

The front support portion 57b is located at an inside portion, in the vehicle width direction, of the front end portion of the bracket 57, and the rear support portion 57c is located at an outside portion, in the vehicle width direction, of the rear end portion of the bracket 57. The gravity center of the bracket 57 including the electric-power convertor 50 is located on the outside, in the vehicle width direction, of a line which connects the center of the front support portion 57b and the center of the rear support portion 57c in the plan view. Accordingly, when the positioning of the bracket 57 is conducted as described above in fixing the bracket 57 attached to the electric-power convertor 50 to the front cross member 16 and the support member 58, the outside portion, in the vehicle width direction, of the bracket 57 slants downward and the lower face of the projection portion 57d rises away from the upper face of the front cross member 16. Consequently, the fixing work may become difficult. Herein, according to the present embodiment, a slant-prevention portion 57i is provided at the outside portion of the front end portion of the bracket 57. This slant-prevention portion 57i is formed to rise from the front end of the cover portion 57a so that a lower face thereof can contact the upper face of the front cross member 16, like the above-described front support portion 57b. Thereby, the outside portion of the bracket 57 can be prevented from slanting by the contact of the lower face of the slant-prevention portion 57i with the upper face of the front cross member 16. Consequently, it can be prevented that the lower face of the projection portion 57d rises away from the upper face of the front cross member 16.

Since the bracket 57 is fixed to the upper face of the front cross member 16 and the upper face of the support member 58 as described above, the electric-power convertor 50 is supported on and away from the floor panel 15 (front floor portion 15a). Thereby, there exists a gap between the heat sink 52 and the floor panel 15 (front floor portion 15a), so that the heat radiation by the heat sink 52 can be conducted properly.

Further, since the heat sink 52 is arranged below the body portion 51 of the electric-power convertor 50, in a case in which a lower portion of the vehicle is covered with water, it can be properly avoided that the case 51a of the body portion 51 is located under the water. That is, in a case in which the heat sink 52 is arranged above the body portion 51 of the electric-power convertor 50, since a space to radiate the heat above the heat sink 52 may become necessary, the body portion 51 of the electric-power convertor 50 may be located close to the upper face of the floor panel 15. Accordingly, when the water level becomes slightly higher than the upper face of the floor panel 15, the water may come into the case 51a, so that there is a concern that the DC/DC convertor may receive damages. Therefore, it is preferable that the water be properly restrained from coming into the case 51a even in this case by the arrangement of the present embodiment.

The electric-power convertor 50 is supported on the floor panel 15 via the front cross member 16 and the support member 15 by using the bracket 57 in such a manner that the upper face of the electric-power convertor 50 (and the upper face of the bracket 57) slants obliquely forward and upward. That is, the upper face of the front cross member 16 is located above the level of the upper face of the support member 58, and the level of the bracket 57 rises toward the front cross member 16 from the support member 58. Thus, the bracket 57 is supported on the floor panel 15 such that the cover portion 57a has the upper face (first and second slant faces 57j, 57k described below) which slants obliquely forward and upward.

Figure 5:
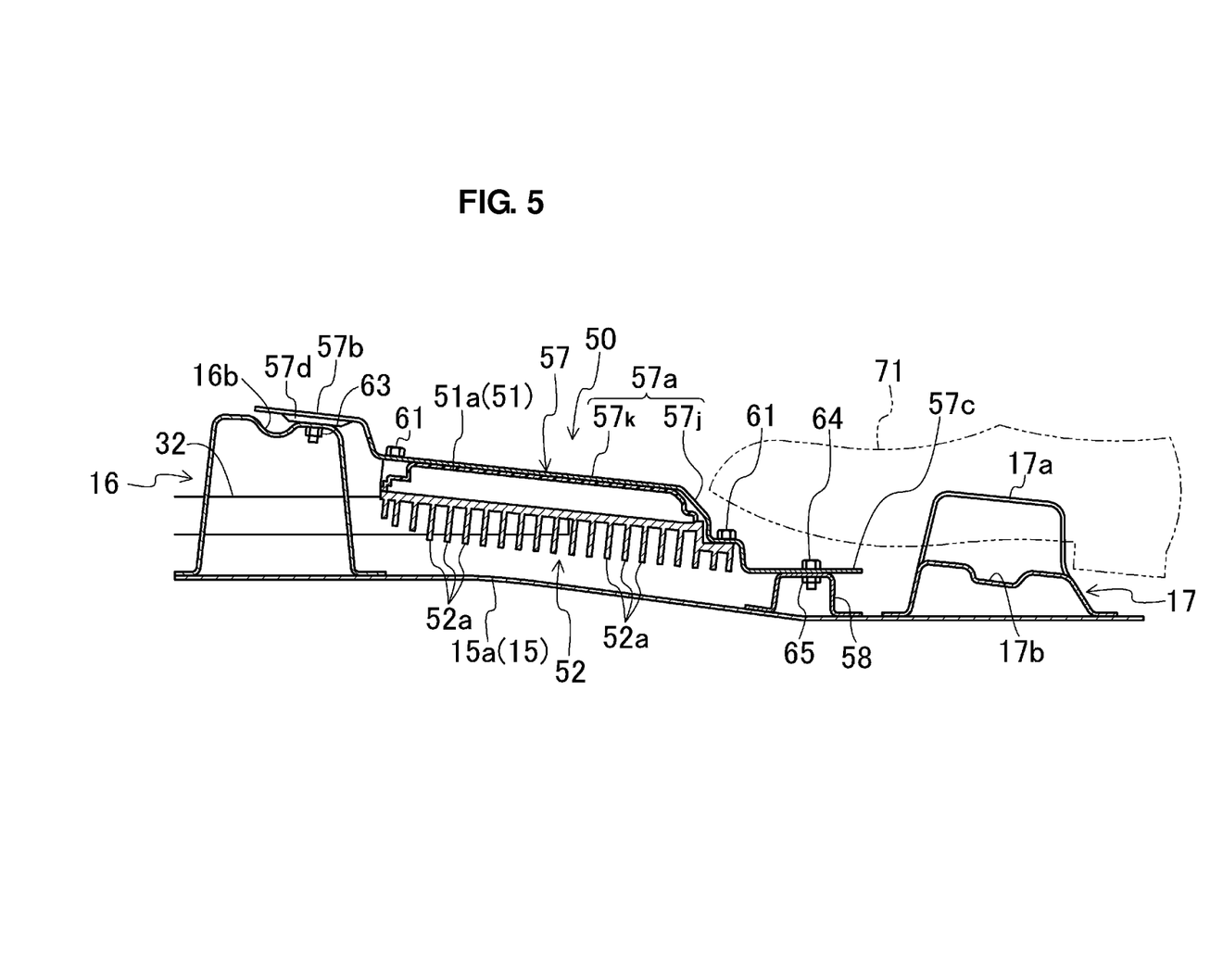
FIG. 5 is a sectional view taken along line V-V of FIG. 3.

The above-described slant face in the present embodiment includes the first slant face 57j which is located in front of the rear support portion 57c and above the rear end portion of the body portion 51 of the electric-power convertor 50 (the case 51a) and the second slant face 57k which is located in front of the first slant face 57j and above the other portion than the rear end portion of the body portion 51 of the electric-power convertor 50 (the case 51a) (see FIG. 5). The first slant face 57j extends and slants obliquely forward and upward from the rising portion formed at the front portion of the rear support portion 57c. The second slant face 57k extends and slants obliquely forward and upward from a front end of the first slant face 57j. The front support portion 57b rises from a front end of the second slant face 57k and is located in front of the second slant face 57k. A slant angle of the first slant face 57j relative to a horizontal line is greater than that of the second slant face 57k relative to the horizontal line. A slant angle of the second slant face 57k relative to the horizontal line is the same as that of the lower rail portion 25a relative to the horizontal line. Herein, the above-described slant face may have only the second slant face 57k without the first slant face 57j.

Since the upper face of the cover portion 57a of the bracket 57 has the first and second slant faces 57j, 57k as described above, the level of the rear side of the cover portion 57a is low. Accordingly, as shown in FIG. 5, even when the tip portion of the foot 71 of the passenger seated in the rear seat 22 comes into a space between the seat cushion 21a of the front seat 21 and the floor panel 15, it may not easily contact the cover portion 57a. Further, when the front seat 21 is located at the foremost position in its sliding range, there is a high possibility that the tip portion of the foot 71 may contact the cover portion 57a. Herein, in a case in which the tip portion of the foot 71 contacts the cover portion 57a, it contacts the first slant face 57j first and then is guided upward by this first slant face 57j. Thus, the foot's tip portion may not easily contact the second slant face 57k. Moreover, since the upper face of the rear cross member 17 slants obliquely forward and upward, the tip portion of the foot 71 is directed upward when the foot 71 is placed on the upper face of the rear cross member 17. Thereby, it can be also avoided that the tip portion of the foot 71 contacts the cover portion 57a.

Figure 7:
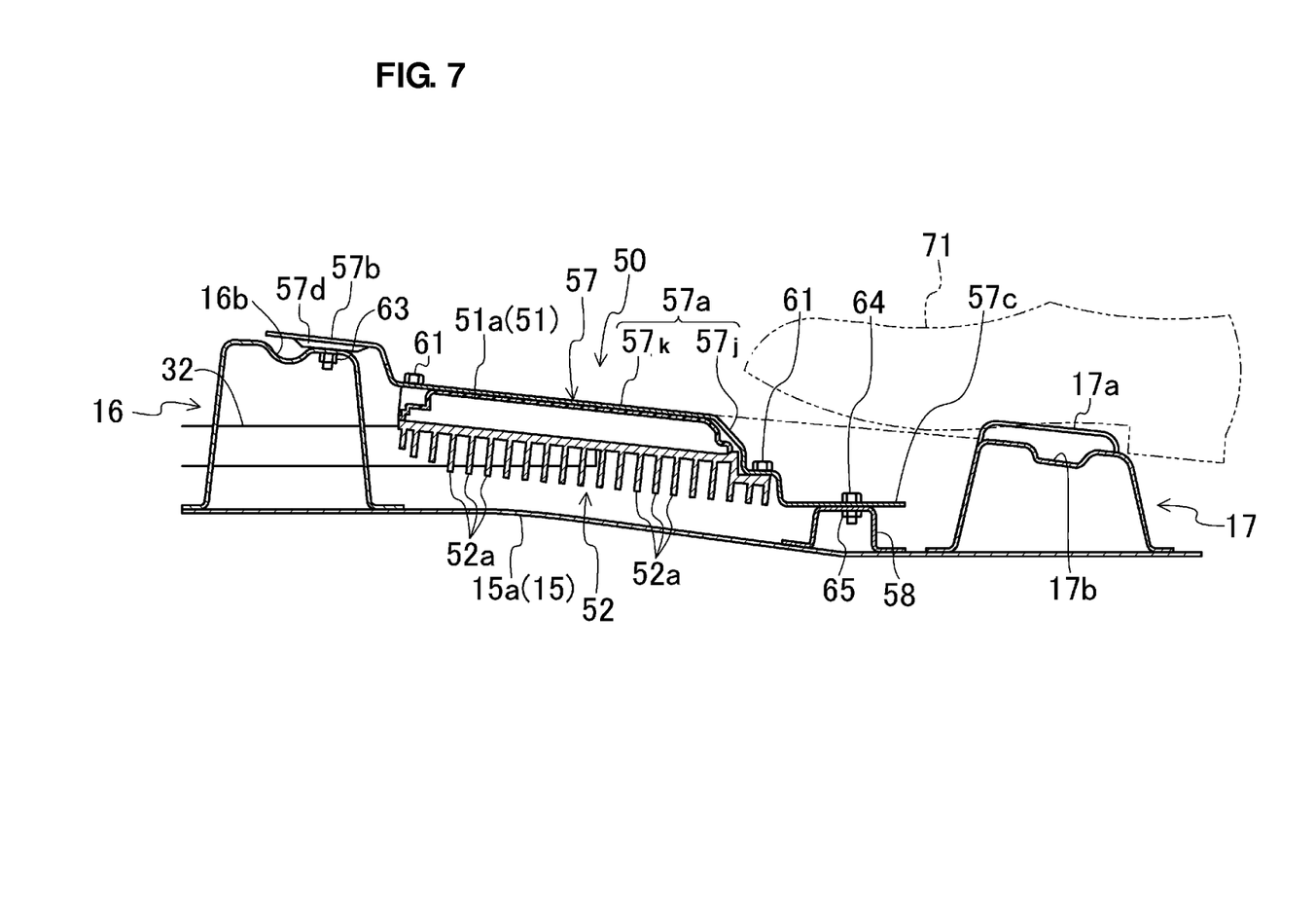
FIG. 7 is a sectional view showing a modified embodiment in which a level relationship between a slant face of a bracket and an upper face of a rear cross member is modified.

Herein, while the second slant face 57k is located above the level of an extension face of the upper face (which is a portion other than the rail fixing portion 17a and slants forward and upward as described above) of the rear cross member 17, the bracket 57 may be provided as shown in FIG. 7 such that at least part of the above-described slant face (the second slant face 57k in FIG. 7) is located on an extension of the upper face (which is the portion other than the rail fixing portion 17a and slants forward and upward as described above) of the rear cross member 17. In this structure, since the tip portion of the foot 71 placed on the upper face of the rear cross member 17 is directed almost along the slant face (the second slant face 57k) located on the extension of the upper face of the rear cross member 17, it can be further avoided that the tip portion of the foot contacts the cover portion 57a. In this case, the first slant face 57j can be omitted in particular. Herein, while the level of the upper face (the portion other than the rail fixing portion 17a) of the rear cross member 17 shown in FIG. 7 is changed from that shown in FIG. 5, the level of the bracket 57 may be changed instead.

Herein, a whole part of the electric-power convertor 50 overlaps the seat cushion 21a of the front seat 21 in a plan view when the front seat 21 slides forward and located at a foremost position in its sliding range (see FIGS. 2 and 3). While the rear end of the seat cushion 21a at the foremost position is located substantially at the same position, in the vehicle longitudinal direction, as the rear end of the rear support portion 57c in the present embodiment, it may be preferable that the rear end of the seat cushion 21a at the foremost position be located in back of the rear end of the body portion 51 of the electric-power convertor 50.

The electric-power convertor 50 extends rearward up to a position in back of the outlet 32a of the air-conditioning duct 32 below the seat cushion 21a of the front seat 21. That is, the rear end of the electric-power convertor 50 is located in back of the outlet 32a. A rear end portion 50a of the electric-power convertor 50 which is located in back of the outlet 32a is formed in a notch shape such that its duct-side edge portion (its vehicle inside portion) extends obliquely rearward and in a specified direction (in a vehicle outside direction), in the vehicle width direction, away from the air-conditioning duct 32. Respective portions of the body portion 51 (the case 51a), the heat sink 52 and the bracket 57 which correspond to the above-described notch portion 50a of the electric-power convertor 50 are formed in a triangle shape in the plan view. Thus, a face of the notch portion 50a slants rearward and in an opposite direction to the air-conditioning duct (outward). This notch portion 50a functions so that the electric-power convertor 50 can be located outside a supply range of the conditioning air supplied from the outlet 32a (a range illustrated with a slash mark in FIG. 3). Herein, while part of the rear support portion 57c of the bracket 57 appears to overlap the above-described supply range of the conditioning air in the plan view, the rear support portion 57c is actually located below the level of the supply range of the conditioning air because the conditioning-air flow rises upward and rearward, so that the electric-power convertor 50 is substantially located outside the supply range of the conditioning air.

As described above, according to the present embodiment, the electric-power convertor 50 emitting heat and the air-conditioning duct 32 are arranged side by side in the vehicle width direction, and the electric-power convertor 50 has the notch portion 50a on the duct-side edge portion at its rear end portion located in back of the outlet 32a of the air-conditioning duct 32 so that the electric-power convertor 50 is substantially located outside the supply range of the conditioning air. Accordingly, the conditioning air can be properly prevented from directly contact the electric-power convertor 50 (the body portion 51), ensuring the large size of the electric-power convertor 50 (the body portion 51) for the electricity-storage device 43 to store the sufficiently large amount of electricity. Thus, the conditioning air is not blocked with the electric-power convertor 50. Further, since the heat emitted by the electric-power convertor 50 is radiated toward the lower side of the electric-power convertor 50 and the conditioning air does not contact the electric-power convertor 50 directly, the electric-power convertor 50 may not receive any damage from the conditioning air and the conditioning air may not receive any improper influence of the heat of the electric-power convertor 50. Thus, the passenger seated in the rear seat 22 can be prevented from having any uncomfortable feelings and the reliability of the electric-power convertor 50 can be improved.

Moreover, according to the present embodiment, the upper face of the cover portion 57a of the bracket 57 supported on the upper faces of the front cross member 16 and the support member 58 has the first and second slant faces 57j, 57k which slant forward and upward, respectively. Accordingly, the level of the rear side of the cover portion 57a is properly low, and even when the tip portion of the foot 71 of the passenger seated in the rear seat 22 comes into the space between the seat cushion 21a of the front seat 21 and the floor panel 15, it can be properly avoided that the tip portion of the foot 71 contacts the cover portion 57a. Further, when the front seat 21 is located at the foremost position in its sliding range, there is a high possibility that the tip portion of the foot 71 may contact the cover portion 57a. However, according to the present embodiment, in a case in which the tip portion of the foot 71 contacts the cover portion 57a, it contacts the first slant face 57j first and then is guided upward by this first slant face 57j, so that the foot's tip portion may not easily contact the second slant face 57k. Moreover, the rear side of the electric-power convertor 50 can be covered with the portion of the cover portion 57a having the first slant face 57j. Consequently, the electric-power convertor 50 can be protected from the contact of the foot of the passenger seated in the rear seat 22. Also, the foot space of the passenger seated in the rear seat 22 may not be restricted improperly by the electric-power convertor 50. Moreover, since the portion of the cover portion 57a having the second slant face 57k substantially covers over the electric-power convertor 50, the size of the electric-power convertor 50 (the body portion 51) for the electricity-storage device 43 to store the sufficiently large amount of electricity can be made properly large.

Further, the covering over the electric-power convertor 50 with the cover portion 57a of the bracket 57 together with the downward heat radiation by the heat sink 52 can prevent the heat of the electric-power convertor 50 from being directed toward the passenger's foot 71. Consequently, it can be properly prevented that the heat causes any uncomfortable feelings to the passenger.

The present invention should not be limited to the above-described embodiment and modification, and any other further modifications or improvements may be applied within the scope of a sprit of the present invention.

For example, while the rear end of the electric-power convertor 50 of the above-described embodiment is located in back of the outlet 32a of the air-conditioning duct 32, it may be located substantially at the same position as the outlet 32a or in front of the outlet 32a. In this case, there is no need to form the notch portion 50a at the electric-power convertor 50.

However, it is preferable in order to ensure the properly large size of the electric-power convertor 50 (the body portion 51) that the rear end of the electric-power convertor 50 of the above-described embodiment be located in back of the outlet 32a of the air-conditioning duct 32 like the above-described embodiment.

Also, while the electric-power convertor 50 of the present embodiment is arranged on the outside, in the vehicle width direction, of the air-conditioning duct 32, it may be arranged on the inside, in the vehicle width direction, of the air-conditioning duct 32 instead. However, it is preferable in order to facilitate the coupling work of the first and second harnesses 35, 36 that at least the harness coupling portion 53 of the electric-power convertor 50 be located on the outside, in the vehicle width direction, of the air-conditioning duct 32 (and the body portion 51 of the electric-power convertor 50).

Further, while the two slant faces 57j, 57k are formed at the upper face of the cover portion 57a in the present embodiment, a single slant face or three or more slant faces arranged longitudinally may be formed. In a case in which plural slant faces are formed, a horizontal face may be formed between them.

Also, while the example of the electric-power convertor 50 including the DC/DC convertor as an electric component emitting heat has been described above, the electric component should not limited to this. For example, the electricity-storage device 43 included the capacitor may be applied as an electric component emitting heat. Herein, the electricity-storage device 43 may include, in place of the capacitor, a rechargeable battery to store electricity (for example, Nickel metal hydride rechargeable battery, Nickel-Cadmium rechargeable battery, Lithium-ion rechargeable battery, Lead-acid battery). However, the capacitor may be preferable because it can achieve a prompt input/output of the electricity for the electricity-storage device 43.

Moreover, while the vehicle of the present embodiment is a type of vehicle driven by an engine, an electric vehicle which has a motor disposed in the engine room 3 (may be called a motor room) and driven by this motor or a hybrid vehicle driven by both the engine and the motor may be applied. In these vehicles using the motor, it is necessary to provide a motor-driving battery (a power unit) and an inverter unit which includes an inverter to convert the direct-current electric power from the motor-driving battery to the alternating-current electric power for the motor. Herein, the motor-driving battery or the inverter unit may be arranged between the seat cushion 21a of the front seat 21 and the floor panel 15 as an electric component emitting heat.

What is claimed is:

1. An electric component arrangement structure of a vehicle, comprising:
    a floor panel forming a bottom face of a vehicle compartment of the vehicle;
    a front seat supported on the floor panel so as to slide in a vehicle longitudinal direction;
    a rear seat arranged on the floor panel behind the front seat;
    an electric component arranged between a seat cushion of the front seat and the floor panel, the electric component emitting heat; and
    an air-conditioning duct arranged on the floor panel to extend in the vehicle longitudinal direction, the air-conditioning duct having an outlet at a rear end thereof, through which a conditioning air is supplied toward a passenger seated in the rear seat,
    wherein said electric component and said air-conditioning duct are arranged side by side in a vehicle width direction, said air-conditioning duct supplies a hot conditioning air, and a rear end portion of said electric component which is located in back of the outlet of the air-conditioning duct is formed in a notch shape such that a duct-side edge portion thereof extends obliquely rearward and in a specified direction, in the vehicle width direction, away from the air-conditioning duct.

2. The electric component arrangement structure of a vehicle of claim 1, wherein said electric component is arranged on an outside, in the vehicle width direction, of said air-conditioning duct.

3. The electric component arrangement structure of a vehicle of claim 1, wherein said electric component is an electric-power convertor which is coupled to an electricity-storage device to store electricity via a harness and converts an electric power from the electricity-storage device for a vehicle-on-board electric equipment, and the electric component and the electricity-storage device are arranged on the same side of the vehicle relative to a center, in the vehicle width direction, of the vehicle.

4. The electric component arrangement structure of a vehicle of claim 1, further comprising a bracket to support said electric component on said floor panel, wherein said bracket comprises a cover portion to cover an upper side of the electric component and is arranged such that the cover portion thereof has an upper face which slants obliquely forward and upward.

5. The electric component arrangement structure of a vehicle of claim 4, wherein said bracket comprises a support portion to be supported on the floor panel at a rear end portion thereof, said upper face of the cover portion of the bracket includes a first slant face which is located in front of said support portion and a second slant face which is located in front of said first slant face, and a slant angle of the first slant face relative to a horizontal line is greater than that of the second slant face relative to the horizontal line.

6. The electric component arrangement structure of a vehicle of claim 4, wherein said bracket supports said electric component on the floor panel such that the electric component is located above and away from the floor panel.

7. The electric component arrangement structure of a vehicle of claim 4, wherein said bracket supports said electric component on the floor panel such that the electric component is located above and away from the floor panel, and said electric component comprises a body portion to emit the heat and a heat sink to radiate the heat emitted by the body portion, the heat sink being arranged below the body portion.

8. The electric component arrangement structure of a vehicle of claim 4, wherein when said front seat slides forward and located at a foremost position, a whole part of said electric component overlaps a seat cushion of the front seat in a plan view.

9. The electric component arrangement structure of a vehicle of claim 4, further comprising a front cross member which is arranged on said floor panel in front of said electric component and extends in the vehicle width direction, wherein a front end portion of said bracket is supported on an upper face of said front cross member, and a rear end portion of the bracket is supported on a specified portion of the floor panel in back of the electric component.

10. The electric component arrangement structure of a vehicle of claim 4, further comprising a rear cross member which is arranged on said floor panel in back of said electric component and extends in the vehicle width direction, wherein an upper face of said rear cross member slants obliquely forward and upward.

11. The electric component arrangement structure of a vehicle of claim 4, further comprising a rear cross member which is arranged on said floor panel in back of said electric component and extends in the vehicle width direction, wherein an upper face of said rear cross member slants obliquely forward and upward, wherein at least part of the slant upper face of the cover portion of said bracket is located on an extension of the upper face of said rear cross member.

12. An electric component arrangement structure of a vehicle, comprising:
   a floor panel forming a bottom face of a vehicle compartment of the vehicle;
   a front seat supported on the floor panel so as to slide in a vehicle longitudinal direction;
   a rear seat arranged on the floor panel behind the front seat;
   an electric component arranged between a seat cushion of the front seat and the floor panel, the electric component emitting heat; and
   an air-conditioning duct arranged on the floor panel to extend in the vehicle longitudinal direction, the air-conditioning duct having an outlet at a rear end thereof, through which a conditioning air is supplied toward a passenger seated in the rear seat,
   wherein said electric component and said air-conditioning duct are arranged side by side in a vehicle width direction, said electric component comprises a body portion and a harness coupling portion for coupling a harness to the body portion, and said harness coupling portion is arranged on an outside, in the vehicle width direction, of said body portion of the electric component and the air-conditioning duct.

13. The electric component arrangement structure of a vehicle of claim 12, further comprising a bracket to support said electric component on said floor panel, wherein said bracket comprises a cover portion to cover an upper side of the electric component and is arranged such that the cover portion thereof has an upper face which slants obliquely forward and upward.

14. An electric component arrangement structure of a vehicle, comprising:
   a floor panel forming a bottom face of a vehicle compartment of the vehicle;
   a front seat supported on the floor panel so as to slide in a vehicle longitudinal direction;
   a rear seat arranged on the floor panel behind the front seat;
   an electric component arranged between a seat cushion of the front seat and the floor panel, the electric component emitting heat; and
   an air-conditioning duct arranged on the floor panel to extend in the vehicle longitudinal direction, the air-conditioning duct having an outlet at a rear end thereof, through which a conditioning air is supplied toward a passenger seated in the rear seat,
   wherein said electric component and said air-conditioning duct are arranged side by side in a vehicle width direction, a cross member which is arranged on said floor panel and extends in the vehicle width direction across said air-conditioning duct is provided, said air-conditioning duct penetrates said cross member in the vehicle longitudinal direction, and said electric component is supported on an upper face of the cross member.

15. The electric component arrangement structure of a vehicle of claim 13, further comprising a bracket to support said electric component on said floor panel, wherein said bracket comprises a cover portion to cover an upper side of the electric component and is arranged such that the cover portion thereof has an upper face which slants obliquely forward and upward.

16. An electric component arrangement structure of a vehicle, comprising:
   a floor panel forming a bottom face of a vehicle compartment of the vehicle;
   a front seat supported on the floor panel so as to slide in a vehicle longitudinal direction;
   a rear seat arranged on the floor panel behind the front seat;
   an electric component arranged between a seat cushion of the front seat and the floor panel, the electric component emitting heat; and
   a bracket supporting said electric component on said floor panel, the bracket comprising a cover portion to cover an upper side of the electric component and being arranged such that the cover portion thereof has an upper face which slants obliquely forward and upward.

* * * * *